(12) United States Patent
Frecska et al.

(10) Patent No.: US 6,693,512 B1
(45) Date of Patent: Feb. 17, 2004

(54) DEVICE LOCATION AND IDENTIFICATION SYSTEM

(75) Inventors: Sandor A. Frecska, Lancaster, PA (US); JoAnne LeFever, Lancaster, PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 560 days.

(21) Appl. No.: 09/619,081

(22) Filed: Jul. 17, 2000

(51) Int. Cl.[7] .................................................. H04Q 5/22
(52) U.S. Cl. ................................ 340/10.1; 340/825.49; 340/10.52; 340/10.42; 340/572.1
(58) Field of Search ......................... 340/10.1, 825.49, 340/10.52, 10.51, 10.3, 10.31, 572.1, 825.69, 825.72, 10.42; 235/462.32; 324/326, 329; 116/209; 52/105; 283/70

(56) References Cited

U.S. PATENT DOCUMENTS

| | | | | |
|---|---|---|---|---|
| 4,656,463 A | * | 4/1987 | Anders et al. | 340/541 |
| 4,724,309 A | * | 2/1988 | Greene | 235/468 |
| 4,725,078 A | * | 2/1988 | Janicki | 283/70 |
| 4,740,257 A | | 4/1988 | Halls et al. | 156/92 |
| 5,523,750 A | * | 6/1996 | de Vall | 340/870.31 |
| 5,756,981 A | * | 5/1998 | Roustae et al. | 235/462 |
| 5,942,987 A | * | 8/1999 | Heinrich et al. | 340/825.54 |
| 6,076,859 A | * | 6/2000 | Hall et al. | 283/89 |
| 6,133,738 A | * | 10/2000 | Minarovic | 324/326 |
| 6,133,832 A | * | 10/2000 | Winder et al. | 340/572.1 |
| 6,206,282 B1 | * | 3/2001 | Hayes, Sr. et al. | 235/375 |
| 6,249,227 B1 | * | 6/2001 | Brady et al. | 340/572.1 |
| 6,437,572 B1 | * | 8/2002 | Vokey | 324/326 |
| 6,486,780 B1 | * | 11/2002 | Garber et al. | 340/572.1 |
| 6,542,083 B1 | * | 4/2003 | Richley et al. | 340/825.49 |

\* cited by examiner

*Primary Examiner*—Michael Horabik
*Assistant Examiner*—Vernal Brown

(57) ABSTRACT

A method and system for identifying panels that embed active and passive components of an electronic device, or that hide certain key components of a building's infrastructure in the plenum of the ceiling. In one aspect, a panel is provided with a phosphorescent or other light-responsive indicia that is representative of an object hidden within the panel or that is part of the building infrastructure hidden by a plurality of panels. A panel having a device embedded within it is identified by first placing a light-responsive indicia on the panel that is representative of the devices stored therein or the building infrastructure lying above it. The panel is then irradiated and the light-responsive indicia observed. In another aspect, a panel having an embedded object is provided with an indicator device that is embedded in the same panel. The indicator detects a query signal emitted by a scanner, compares the detected signal with information stored in the memory of the indicator, and if a match is found, emits a visible or audible signal from a signal output device into the room below. The signal output device can be a light emitting diode or a sound generator.

42 Claims, 5 Drawing Sheets

DEVICE LOCATION AND IDENTIFICATION SYSTEM

BACKGROUND OF THE INVENTION

This invention relates generally to identification devices. More specifically, it relates to identification devicesadapted for use with building products.

Present day office systems and industrial environments include as essential equipment, computers and other communication and information processing devices that are interconnected in a network. For example, local area networks (LANs) are frequently used in office environments. Such networks are important for providing computer services, energy management such as, for example, controlling the heating and lighting of rooms, and similar services within an office or building. These networks generally are hard-wired through outlets at fixed, limited locations within a room or space. The outlets are typically in a wall near the floor, and thus are often obstructed by furniture or equipment located within the room. Furthermore, as a physical wire connection needs to be made to each of the elements of the network, the element locations are generally limited.

Because the ceiling of a room is typically the only continuous, unobstructed plane, it is advantageous to include wireless communication devices or other devices in a ceiling. Where the ceiling is tiled, it is often preferable to embed the devices within the tile so that the devices do not protrude into the room, and so that the ceiling has a uniform and aesthetic appearance.

When the devices are hidden, tiles having such devices cannot readily be distinguished from tiles not having such devices installed. This is problematic from the viewpoint of maintaining and servicing the devices within the tiles and any apparatus or systems that use the devices.

There are times when there are different devices in ceiling tiles, which can be wireless communication links such as antennas, sensors, or active devices such as air quality mitigation devices, etc. In controlling or distinguishing these devices, a system capable of differentiating the different devices is essential.

A related problem is that a ceiling made up of an interconnected system of ceiling tiles, typically hides building infrastructure, such as pipes, valves, duct work, electrical outlets, etc. Therefore, in addition to certain ceiling tiles having devices or active components embedded within the tiles, certain tiles will often hide critical components of the building infrastructure. While this effect is aesthetically pleasing, the components of the building infrastructure, at some point or another, will need to be readily located and accessed for maintenance or replacement purposes.

SUMMARY OF THE INVENTION

The present invention provides a method and system for identifying panels (e.g., ceiling tiles) that embed active and passive components of an electronic device, or that hide certain key components of a building's infrastructure in the plenum of the ceiling. The system provides detailed information about the object that is physically located behind, or within, a panel, without having to move the panel to identify the object.

In one aspect of the present invention, a panel is provided with a phosphorescent or other light-responsive indicia that is representative of a device hidden within the panel or that is part of the building infrastructure hidden by a plurality of panels. A panel having a device embedded within it can be identified by first placing a light-responsive indicia on the panel that is representative of the devices stored therein or the building infrastructure lying above it. The panel is then irradiated and the light-responsive indicia observed. The panel or panel system is irradiated with light of a wavelength so as to make the indicia visible to an observer.

In another aspect of the present invention, a panel is provided with an indicator device that is embedded in the same panel as that containing an embedded device that is being searched for, and is responsive to a query emitted from a scanner device, which can be a portable, hand-held radio frequency (RF) or infrared transmitter/receiver. The indicator can be a radio frequency identification (RFID) transponder which detects the query signal emitted by the scanner, compares the detected signal with information stored in the memory of the indicator, and if a match is found, emits a visible or audible signal from a signal output device into the room below. The signal output device can be a light emitting diode or a sound generator, such as a speaker.

DESCRIPTION OF DRAWINGS

The invention is better understood by reading the following detailed description of the invention in conjunction with the accompanying drawings, wherein.

DETAILED DESCRIPTION OF THE INVENTION

The present invention is a method and apparatus for identifying ceiling panels that contain active and/or passive components of an embedded device, or that hide certain key components of a building's infrastructure from an observer positioned in the room below the ceiling tile.

Figure 1:
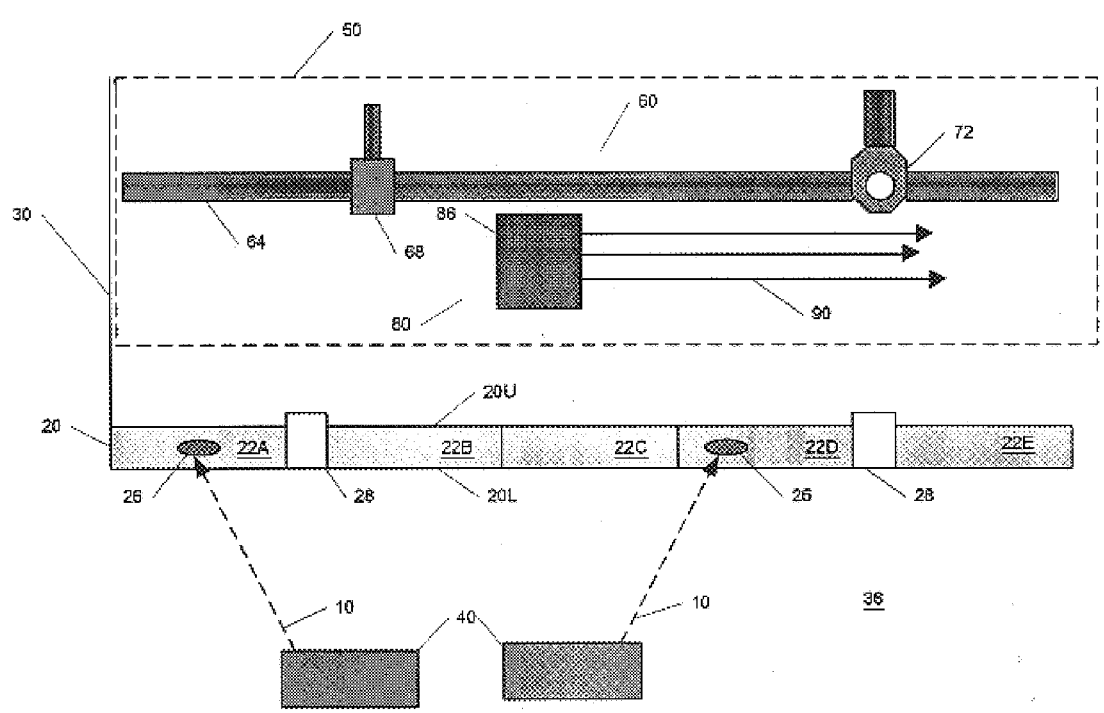
FIG. 1 illustrates a cross-sectional view of a portion of a ceiling tile system in which the present invention can be utilized.
Figure 2:
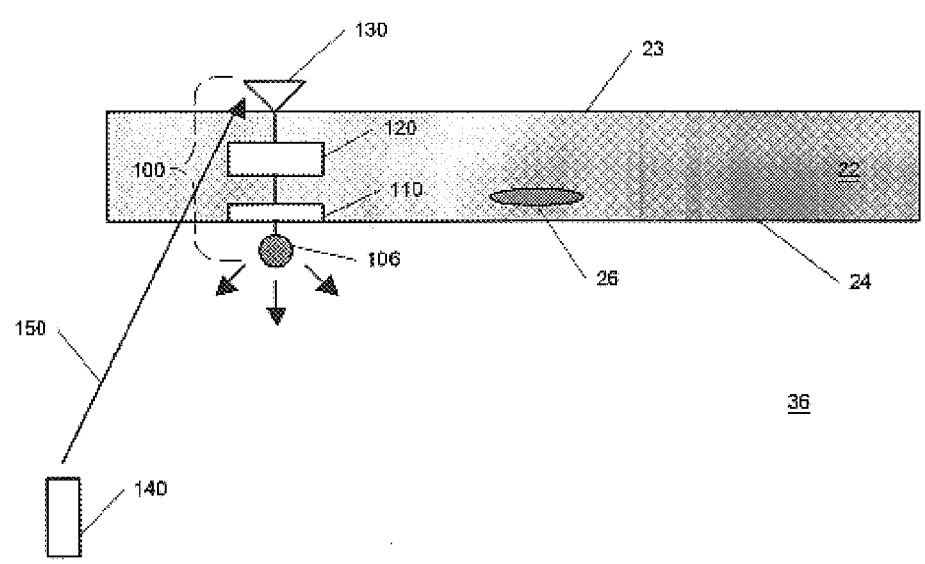
FIG. 2 illustrates a cross-sectional view of a ceiling tile with an embedded object and an embedded indicator device.

Referring to FIG. 1, a side schematic view of a portion of a ceiling tile system 20 is shown having an upper surface 20U and a lower surface 20L and comprising a plurality of individual ceiling tiles 22, five of which are depicted as ceiling tiles 22A–22E. Each ceiling tile has an upper surface 23 and a lower surface 24 as illustrated in FIG. 2. Ceiling tile system 20 is suspended from a fixed ceiling (not shown) by suspension members 30, only one of which is depicted in FIG. 1. Ceiling tiles 22A and 22D have an embedded object 26 installed therein. Also included in the ceiling tile system 20 are light sources 28, which emit light having a wavelength range (i.e., spectral bandwidth) that is dependent on the nature of the light source, e.g., incandescent, fluorescent, halogen, etc.

Adjacent to the lower surface 20L of the ceiling tile system 20 is a room interior 36, which may be an office having electronic devices 40, such as computers that are part of a local area network (LAN). The room interior 36 is illuminated by the ceiling light sources 28. Adjacent to the upper surface 20U of ceiling tile system 20 is building infrastructure 50 including, by way of example, a plumbing system 60, having pipes 64, valve 68, pump 72, and an electrical system 80 including circuit breaker unit 86 and wiring 90 leading to a variety of electrical devices (not shown).

Still referring to FIG. 1, an object 26 is embedded within ceiling tiles 22A and 22D. The object 26 can be an electronic communication device such as a "wireless" communication bus or a transmitter/receiver that receives wireless signals 10 from electronic devices 40 and transmits information based on the received wireless signals 10 to a central processing unit (not shown) with which the device is in electronic communication. When ceiling tile system 20 is viewed from the room interior 36, it is not apparent which of the ceiling tiles 22A–22E contain embedded objects 26.

FIG. 2 shows a cross-sectional view of a ceiling tile 22 with an embedded indicator device 100. The indicator device 100 includes a signal output device 106, a memory chip 110 electrically connected to the signal output device 106, a micro-capacitor 120 electrically connected to the memory chip 110, and an antenna 130 electrically connected to the micro-capacitor 120. The micro-capacitor must be of sufficient size to power the signal output device. Alternative sources of power include a miniature battery electrically connected to the antenna and signal output device. The signal output device can also be powered by a power source located in the plenum. The indicator device 100 can be a radio frequency (RFID) tag. The signal output device 106 can be a light emitting diode (LED) or a sound generator. If the signal output device 106 is an LED, it preferably is located at or extends below the lower surface 24 of ceiling tile 22 so that its output is visible to an observer in room interior 36. Memory chip 110 contains information about the embedded object 26, including its make and model number, its operating parameters, and its location in the ceiling tile 22. Memory chip 110 also contains information about the type of query signal received by the antenna 130 to which the indicator device 100 should respond.

RFID technology is based on bi-directional radio frequency communication between a microprocessor-based control system equipped with a read/write unit, and an RFID tag (transponder) attached to an object. The tag includes an antenna, control circuitry, and memory in which ID information is stored. The memory can be read only or it can be read/write. If it is read only, then the stored information cannot be altered by the user. If it is read/write, the stored information can be overwritten or added to memory at a later date by the user. The read/write unit includes an antenna and modulation/demodulation circuits controlled by the microprocessor. In operation, the unit emits an electromagnetic field which extends over a certain volume from the unit. If an RFID tag passes into this volume, the field activates the control circuitry of the tag. The tag identifies itself by transmitting radio frequency waves back to the control unit.

In operation, the following acts are performed to locate and identify a device embedded in a ceiling tile using a programmable radio frequency (RF) scanner:

Step 1: Program scanner unit
   A scanner unit 140, such as a hand-held radio frequency (RF) device, is pre-programmed to emit a particular type of query signal corresponding to the embedded object 26 whose location is being sought. The person operating the scanner unit 140 can change the query signal 150 and repeat the operation to locate and identify different types of objects 26.

Step 2: Emit a query signal
   Scan unit 140 emits a query signal 150 directed to an intended part of the ceiling tile system.

Step 3: Receive query signal
   The query signal 150 is received by antenna 130 of the RFID transponder. The nature of the query signal 150 corresponds to the object 26 of the object being sought. For example, scanner unit 140 may be a multi-frequency scanner, with a first frequency that is used to locate a wireless receiver object 26, and a second frequency that, is used to locate a speaker object 26. In a ceiling tile system, such query signals 150 are detected by antennas 130 corresponding to a plurality of RFID devices 100.that are installed in a plurality of ceiling tiles 22 in the ceiling tile system 20.

Step 4: Compare query signal to information stored in memory
   The query signal 150 received by the RFID transponder is compared to the form of the signal stored in the memory chip 110 to which the transponder should respond.

Step 5: Emit an output signal
   If the query signal 150 matches corresponding information stored in memory chip 110, then a signal output device 106 is activated and emits an output signal 160 that is visible or audible to an observer in the room interior 36. In a ceiling tile system, the output signals 160 are emitted from the signal output device 106 of those indicator devices 100 that are programmed to respond to the query signal 150 emitted by scanner unit 140.

In one embodiment of this invention, the system is capable of distinguishing at least two embedded devices in a ceiling tile, the system including at least two indicator devices within a ceiling tile, with each device responsive to query signals of a different frequency from a scanner, the indicator devices providing information in the form of an audio or visual output signal for each one of the embedded objects.

In another embodiment of the present invention for identifying ceiling tiles that contain active and passive components of an embedded device, or that hide certain key components of a building's infrastructure, light-responsive indicia are added to the ceiling tile to identify and provide detailed information concerning an object embedded therein or located above a ceiling tile without moving the ceiling tile.

Figure 3:
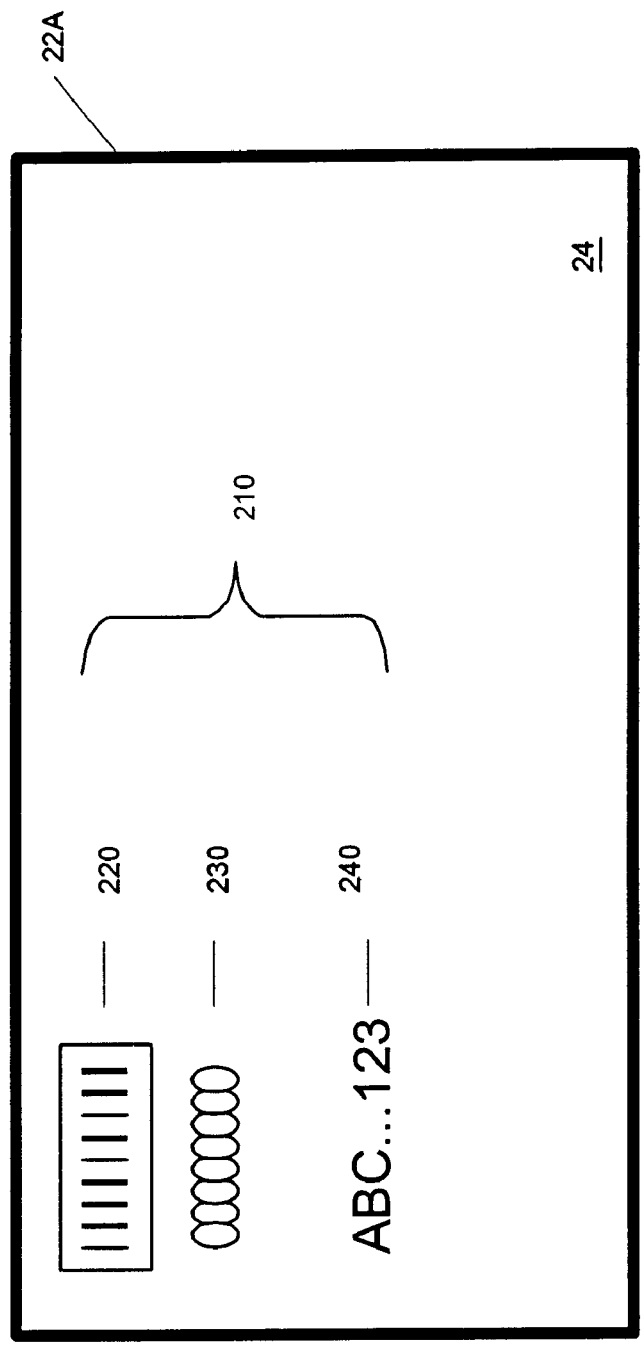
FIG. 3 illustrates a plan view of a lower surface of a ceiling tile having indicia representative of an object embedded within, or located above, the ceiling tile.

Referring now to FIG. 3, a plan view of lower surface 24 of a ceiling tile 22 is illustrated. The lower surface 24 includes indicia 210 that is preferably at least one of a bar code 220, coded dots or symbols 230, or alphanumeric characters 240. Indicia 210 represent in symbolic form the presence or absence of an embedded device 26 or information pertaining thereto. Indicia 210 may also be representative of the above-lying building infrastructure 50. Indicia 210 are preferably formed from a material that is responsive (e.g., fluorescent) to light of a wavelength other than that emitted by ambient light sources 28. This is because it is preferred that indicia 210 remain hidden in the background of lower surface 24 of ceiling tile 22 during normal illumination of the room interior 36. An exemplary material for indicia 210 is a fluorescent paint responsive to ultraviolet (UV) light.

In cases where the indicia 210 is needed to simply indicate the presence or absence of a device 26, the indicia can be very simple, such as a large dot. Alternatively, a great deal of information about device 26 can be included in bar code indicia, such as the make and model number of the device, and its operating parameters.

Figure 4:
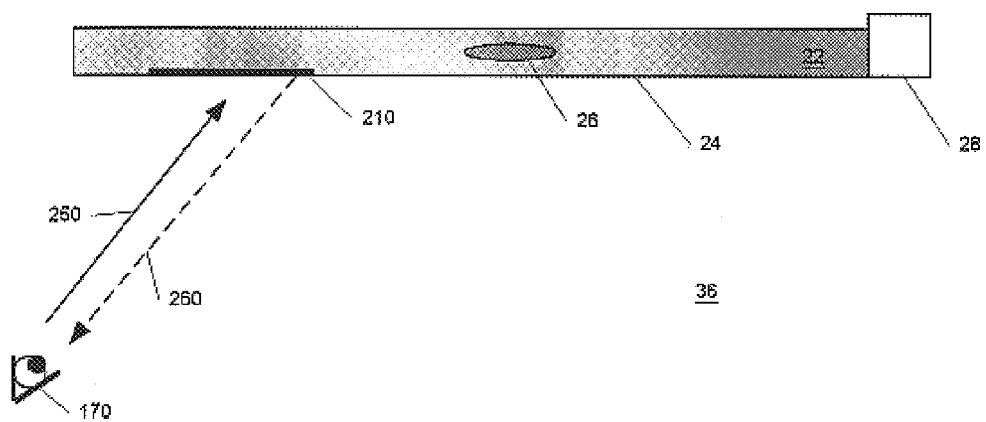
FIG. 4 illustrates a cross-sectional view of a ceiling tile with indicia located on its lower surface.

FIG. 4 shows a cross-sectional view of a ceiling tile with indicia 210 positioned on the lower surface 24. In operation, the following acts are performed to locate and identify an embedded or hidden device using light-responsive indicia:

Step 1: Place indicia on the ceiling tile
    An appropriate indicia 210 is placed on the lower surface 24 of one or more ceiling tiles 22, based on the presence (or absence) of embedded devices within the tiles, and/or based on the over-lying building infrastructure. As described above, indicia 210 preferably conveys as much information as possible while remaining legible to an observer of the indicia.

Step 2: Irradiate the ceiling tile
    The indicia 210 on the ceiling tile is irradiated with radiation 250 of a wavelength that activates the indicia, wherein the wavelength of radiation 250 is substantially different than the wavelength range of light emitted by light sources 28. Indicia 210 then radiates light 260 so that the indicia is visible to an observer 170.

Step 3: View the indicia
    The observer 170 view the irradiated indicia. Observer 170 may need to view indicia 210 through a filter or an infrared or ultraviolet (UV) viewing instrument. However, in one embodiment, a UV light or a so-called "black light" can be used in combination with phosphorescent paint so that the indicia "glows in the dark" In this case, lights 28 may need to be turned off to optimally view the irradiated indicia 210.

Indicia 210 can be sized to be viewed from a distance, or can be sized so that it needs to be viewed through a magnifying device. An advantage of having large-sized indicia 210 is that it can be viewed easily by an observer 170 standing in the room interior 36 from a distance of several feet or more. If indicia 210 is sized to be very small, then a large amount of alphanumeric or bar-coded information pertaining to device 26 and/or the over-lying building infrastructure 50 can be provided.

With respect to step 1 above, in the case where information pertaining to building infrastructure 50 is represented by the indicia 210, large indicia comprising symbols for the various components of the infrastructure may be used on the ceiling tile. For example, a picture of a valve can be used for representing a valve 68; a picture of a pump for representing a pump 72, and picture of a pipe section for representing pipes 64.

Figure 5:
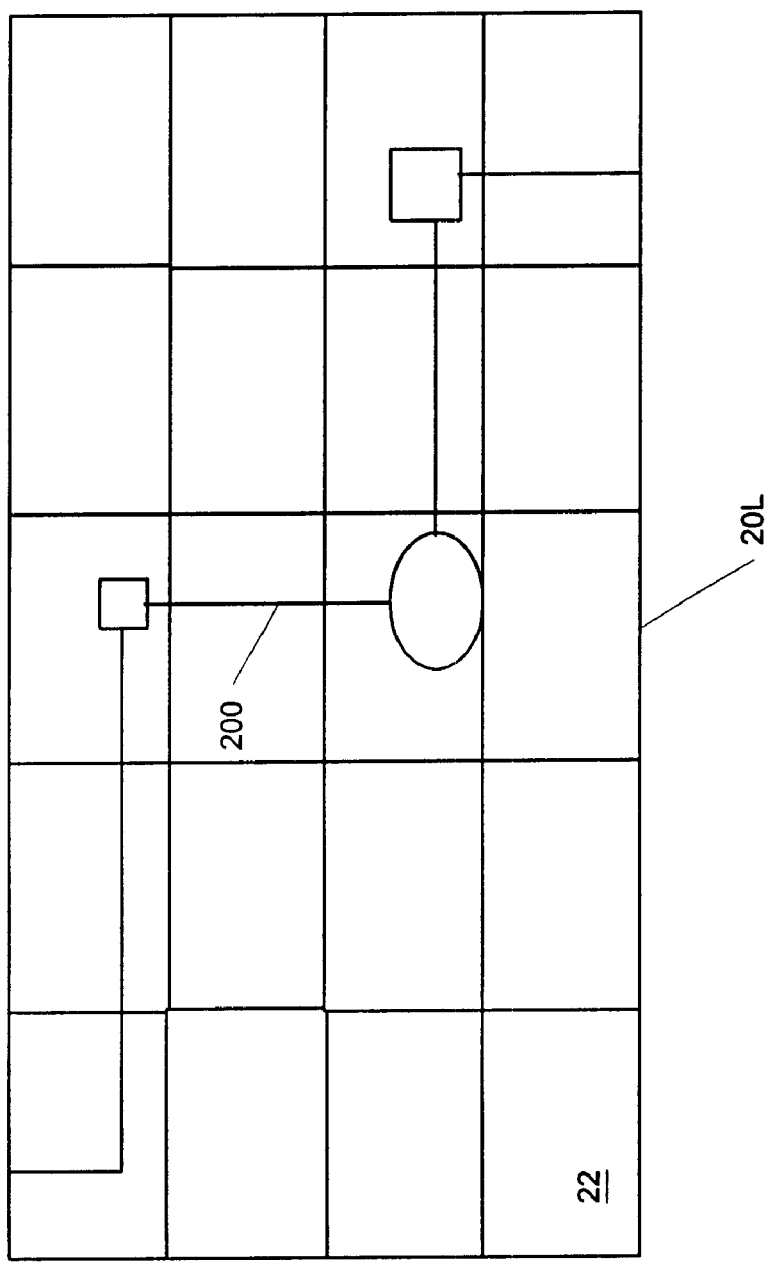
FIG. 5 illustrates a plan view of a lower surface of a ceiling tile system having a mapping of the over-lying building infrastructure.

FIG. 5 represents a plan view of lower surface 20L of ceiling tile system 20 (i.e., looking up at the ceiling from room interior 36) mapping the entire building infrastructure 50 over-lying the ceiling onto lower surface 20L in another embodiment of the present invention. This can be done by projecting computer aided drawings (CAD) of the building infrastructure 50 that is above the plane of ceiling tile system 20 and then imprinting or painting a map 200 onto the lower surface 20L in the manner that indicia 210 is applied to each ceiling tile 22. In this way, when the entire lower surface 20L is blanketed with radiation 250, the entire building infrastructure 50 appears on lower surface 20L, providing in a single glance an "x-ray" schematic view of the over-lying building infrastructure hidden by ceiling tile system 20.

For indicia 210 pertaining to embedded device 26 located within ceiling tile 22, the process of forming the indicia can be done when the tile is formed, or after manufacture. In the case where indicia 210 pertains to building infrastructure 50, the process for forming the indicia is preferably carried out once the building infrastructure is in place and ceiling tile system 20 is in place. However, it is also possible to form indicia 210 pertaining to building infrastructure 50 (including forming the aforementioned map of the entire infrastructure on lower surface 20L) once the building infrastructure is known, and once the ceiling tile system is laid out on paper or in a computer database.

Although the present invention has been described in the context of a ceiling tile system, the device identification and location system can as easily be installed in a room wall by embedding the RFID identification and location system in wall panels or by attachment to an exterior surface of the wall. Furthermore, the light-responsive indicia can also be affixed to an interior surface of a wall structure. Accordingly, the appended claims are not limited to use with a ceiling tile system and the person of skill in the art will be able to readily apply the concepts herein and make further modifications to the embodiments disclosed. Such modifications are within the scope of the present invention.

The corresponding structures, materials, acts, and equivalents of any means plus function elements in any claims below are intended to include any structure, material, or acts for performing the functions in combination with other elements as specifically claimed.

While the embodiment has been particularly shown and described with reference to embodiments thereof, it will be understood by those skilled in the art that various changes in form and detail may be made without departing from the spirit and scope of the present invention.

What is claimed is:

1. A surface covering system comprising:
    a plurality of similar panels;
    an object being hidden by at least one of the plurality of panels;
    a transmitter/receiver device embedded in the at least one of the plurality of panels, the transmitter/receiver device storing identifying information for the hidden object; and
    a scanner for emitting a query signal at a frequency intended to activate a response from the embedded transmitter/receiver device when interrogated by the query signal,
    whereby the identity and location of the hidden object can be determined.

2. The surface covering system of claim 1 wherein the object is embedded in the at least one of the plurality of panels.

3. The surface covering system of claim 1 wherein the transmitter/receiver device comprises a radio frequency identification (RFID) transponder.

4. The surface covering system of claim 1 wherein the transmitter/receiver device comprises an infrared transponder.

5. The surface covering system of claim 3 wherein the RFID transponder has a memory which stores information including the operating parameters of the object.

6. The surface covering system of claim 3 further comprising a signal output device coupled to the RFID transponder to emit a detectable signal when powered by the RFID transponder, the signal output device being selected from the group consisting of a light emitting diode, a sound generator, and a combination thereof.

7. The surface covering system of claim 1 wherein the plurality of panels are ceiling tiles.

8. The surface covering system of claim 1 wherein the scanner is a programmed multiple frequency scanner that generates the query signal at a specific frequency according to the type of object being located.

9. The surface covering system of claim 2 wherein the embedded object is an electronic communication device that communicates wirelessly with at least one electronic device located in a room interior.

10. The surface covering system of claim 1 wherein the scanner is a portable, hand-held unit.

11. The surface covering system of claim 1, wherein the object is hidden behind the at least one of the plurality of panels.

12. The surface covering system of claim 11, wherein the hidden object is part of the building infrastructure.

13. The surface covering system of claim 12, wherein the hidden object is selected from the group consisting of a plumbing fixture, an electrical fixture, a component of a heating ductwork, a component of ventilating ductwork and a component of air conditioning (HVAC) ductwork.

14. The surface covering system of claim 9, wherein the electronic communication device is selected from the group consisting of a communication bus, a transmitter/receiver and an antenna.

15. A method for identifying and locating an object hidden by a surface covering, the method comprising the steps of:
   providing a plurality of similar panels;
   storing identifying information for the hidden object in a memory of a transmitter/receiver device embedded in one of the plurality of panels;
   emitting a query signal by a scanner device to interrogate the embedded transmitter/receiver device at a frequency intended to activate a response;
   comparing the query signal to the identifying information of the hidden object; and
   generating a detectable output signal if the query signal matches the identifying information of the hidden object.

16. The method of claim 15 further comprising receiving an identification and a location of the hidden object by an observer in a room interior.

17. The method of claim 15 wherein the transmitter/receiver device is selected from the group consisting of a radio frequency identification (RFID) transponder and an infrared (IR) transponder.

18. The method of claim 15 further comprising storing information in the memory of the transmitter/receiver device which identifies the location of the hidden object.

19. The method of claim 15 further comprising storing information in the memory the transmitter/receiver device which specifies the operating parameters of the hidden object.

20. The method of claim 15 further comprising activating a signal generator which generates a detectable output signal, the signal generator being selected from the group consisting of a light emitting diode which generates a visible detectable output signal and a sound system which generates an audible detectable output signal.

21. The method of claim 15 further comprising generating a query signal at a specific frequency according to the type of hidden object being identified and located.

22. A surface covering system comprising:
   a plurality of similar panels;
   an object being hidden by at least one of the plurality of panels;
   an indicia affixed to a surface of the at least one of the plurality of panels, the indicia containing identifying information for the hidden object; and
   an illumination device for irradiating the surface of the at least one of the plurality of panels with a light wave,
   whereby the identity and location of the hidden object can be determined.

23. The surface covering system of claim 22 wherein the object is embedded in the at least one of the plurality of panels.

24. The surface covering system of claim 22 wherein the object is hidden behind the at least one of the plurality of panels.

25. The surface covering system of claim 22 wherein the light wave has a wavelength outside the visible spectrum.

26. The surface covering system object of claim 22 wherein the indicia is selected from the group consisting of a bar code code dots, pictorial symbols, and alphanumeric characters.

27. The surface covering system of claim 22 wherein the indicia is a phosphorescent paint.

28. The surface covering system of claim 22 wherein the indicia responds to radiation by radiating a light wave to make the indicia visible to an observer.

29. The surface covering system of claim 28 wherein the indicia is viewable through a device selected from the group consisting of a filter, an infrared viewer, and an ultraviolet viewing instrument.

30. The surface covering system of claim 22 wherein the plurality of panels are ceiling tiles.

31. The surface covering system of claim 23 wherein the embedded object is an electronic communication device that communicates wirelessly with at least one electronic device located in a room interior.

32. The surface covering system of claim 24 wherein the hidden object is part of the building infrastructure.

33. The surface covering system of claim 32 wherein the hidden object is selected from the group consisting of a plumbing fixture, an electrical fixture, a component of a heating ductwork, a component of ventilating ductwork and a component of air conditioning (HVAC) ductwork.

34. The surface covering system of claim 31, wherein the electronic communication device is selected from the group consisting of a communication bus, a transmitter/receiver and an antenna.

35. A method for identifying and locating an object hidden by a surface covering, the method comprising the steps of:
   providing a plurality of similar panels;
   affixing indicia to a surface of at least one of the plurality of panels, the indicia containing identifying information for the hidden object:
   irradiating the surface of the at least one of the plurality of panels with a light wave from an illumination device; and
   in response to the irradiation from the illumination device, radiating a light wave from the indicia to make the indicia visible to an observer.

36. The method of claim 35 wherein the object is embedded in the at least one of the plurality of panels.

37. The method of claim 35 wherein the object is hidden behind the at least one of the plurality of panels.

38. The method of claim 35 wherein the light wave has a wavelength outside the visible spectrum.

39. The method of claim 35 further comprising receiving an identification and a location of the hidden object by an observer in a room interior.

40. The method of claim 35 wherein the indicia is selected from the group consisting of a bar code, code dots, pictorial symbols, and alphanumeric characters.

41. The method of claim 35 further comprising the step of affixing the indicia by applying a phosphorescent paint to the surface.

42. The method of claim 35 further comprising viewing the irradiated indicia through a device selected from the group consisting of a filter, an infrared viewer and an ultraviolet viewing instrument.

* * * * *